(12) United States Patent
Gully

(10) Patent No.: US 6,808,328 B1
(45) Date of Patent: Oct. 26, 2004

(54) SHIFTABLE KEYBOARD TRAY AND METHOD OF USE

(76) Inventor: Robert Gully, 939 Onderdonk Ave., Ridgewood, NY (US) 11385

( * ) Notice: Subject to any disclaimer, the term of this patent is extended or adjusted under 35 U.S.C. 154(b) by 0 days.

(21) Appl. No.: 10/692,506

(22) Filed: Oct. 24, 2003

(51) Int. Cl.[7] .......................... B41J 29/18; G06F 3/023; G06F 3/02
(52) U.S. Cl. ...................... 400/715; 400/489; 400/491; 400/492; 400/480; 400/472; 248/118
(58) Field of Search ................................ 400/489, 480, 400/472, 491, 492, 715; 361/680; 235/145 R; 248/118; G06F 3/023, 3/02

(56) References Cited

U.S. PATENT DOCUMENTS

| | | | |
|---|---|---|---|
| 4,621,781 A | * 11/1986 | Springer | 248/118 |
| 5,342,005 A | * 8/1994 | Szmanda et al. | 248/118 |
| 5,356,099 A | * 10/1994 | Sereboff | 248/118.1 |
| 5,386,957 A | 2/1995 | Miller | 248/118.5 |
| 5,456,542 A | * 10/1995 | Welch et al. | 400/492 |
| 5,564,844 A | * 10/1996 | Patterson, Jr. et al. | 400/492 |
| 5,662,422 A | * 9/1997 | Fort | 400/489 |
| 5,734,548 A | 3/1998 | Park | 361/680 |
| 5,735,618 A | 4/1998 | Gluskoter et al. | 400/472 |
| 5,961,231 A | * 10/1999 | Ambrose | 400/472 |
| 6,076,784 A | 6/2000 | Selker | 248/118 |
| 6,454,224 B1 | 9/2002 | Nogueira | 248/118.5 |

* cited by examiner

Primary Examiner—Andrew H. Hirshfeld
Assistant Examiner—Marissa Ferguson
(74) Attorney, Agent, or Firm—Gene Scott; Patent Law & Venture Group

(57) ABSTRACT

A shiftable keyboard tray comprising a base, a carriage for support of a keyboard movable on the base, and a palm rest movable on the base offset from the carriage and operably connected to the carriage through a coupler configured to enable movement of the carriage in a second direction when the palm rest is moved in an opposite first direction. The coupler comprises a motor mounted in engaging relationship between the carriage and the base and at least one actuation switch coupled to the palm rest and operably connected to the motor. A positioning device is mounted in engaging relationship between the carriage and the base and operably connected to the motor so as to provide data to the motor regarding the position of the carriage. In an alternative embodiment, the positioning device itself serves as the coupler operably connecting the palm rest to the carriage.

20 Claims, 3 Drawing Sheets

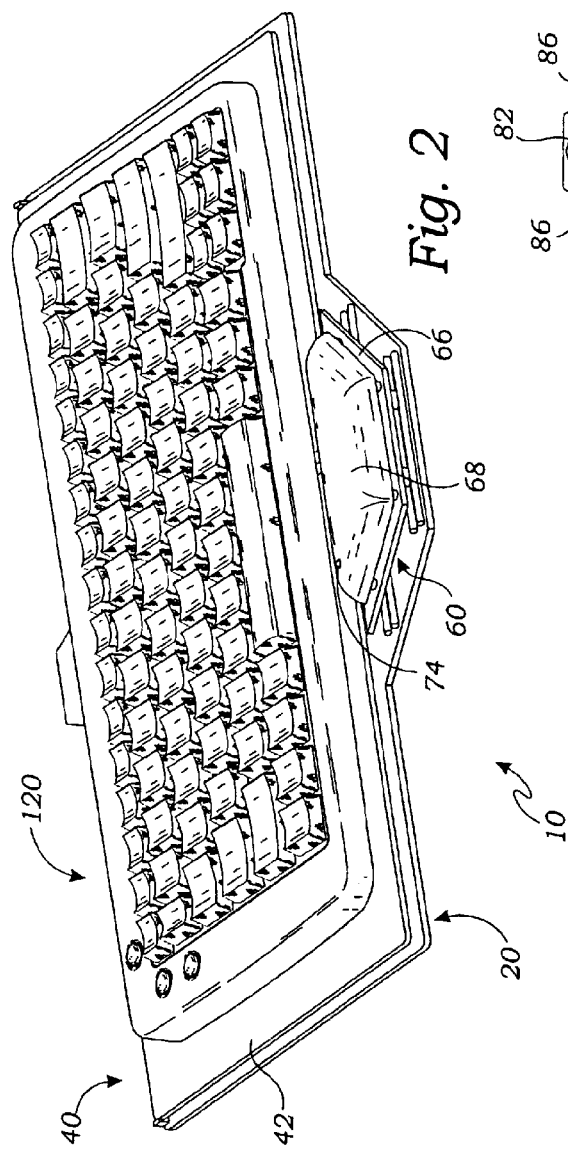
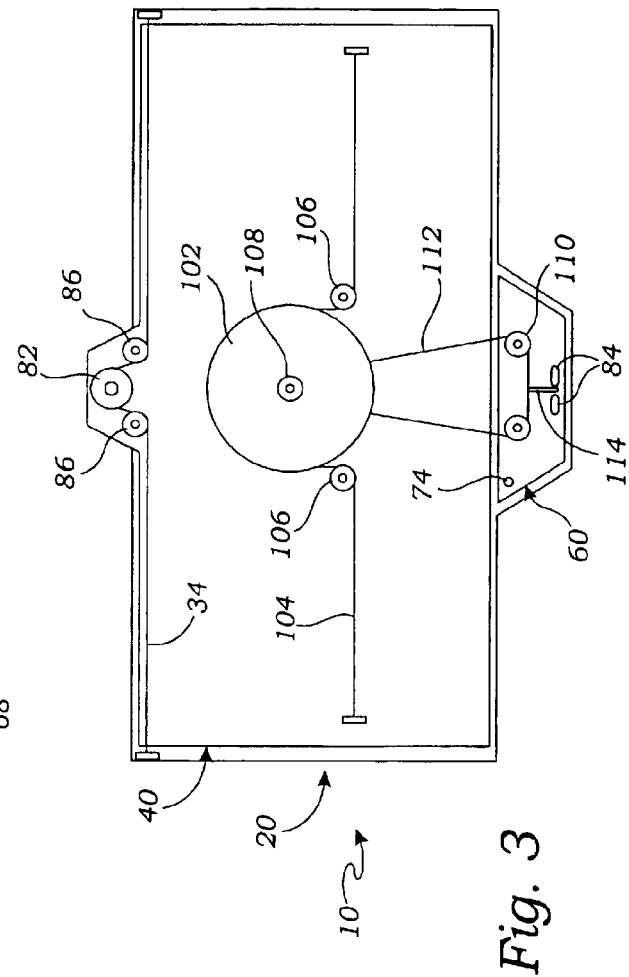

SHIFTABLE KEYBOARD TRAY AND METHOD OF USE

INCORPORATION BY REFERENCE

Applicant(s) hereby incorporate herein by reference, any and all U. S. patents, U.S. patent applications, and other documents and printed matter cited or referred to in this application.

BACKGROUND OF THE INVENTION

1. Field of the Invention

This invention relates generally to keyboard trays, and more particularly to shiftable keyboard trays.

2. Description of Related Art

The following art defines the present state of this field:

Miller, U.S. Pat. No. 5,386,957 describes a hand support that positions the hand of a user over a computer keyboard for digital actuation of the keys comprising the keyboard. A hand rest is supported by gliders for parallel and perpendicular movement relative to the keyboard and is at an elevation for movement over the entire keyboard. A frame supports the gliders and defines cutouts for cable access to the keyboard and/or extension of a monitor from the keyboard and for supporting the arm of the user. A finger may then extend from the hand rest to the keys as the hand rest moves over the keyboard.

Patterson, Jr. et al., U.S. Pat. No. 5,564,844 describes an apparatus for the automatic adjustment of the inclination angle of a keyboard during use by an operator. The unit operates by a motorized camshaft raising and lowering the back end of a hinged platform that supports a computer keyboard or other input device. The rate of change of the inclination angle and the inclination height are adjustable by the operator. The apparatus is useful in the prevention or alleviation of the effects of repetitive motion disease or carpal tunnel syndrome.

Park, U.S. Pat. No. 5,734,548 describes a portable computer having a separable keyboard which includes a base housing, a keyboard spread over the base housing, and a lid that can be folded over the base housing. The keyboard is separated into two sections and a corner of each keyboard section is hinged with the base housing. By a keyboard spring, the two keyboard sections are biased to be rotated together. After the opening of the lid, a user may manually rotate the keyboard halves apart to one of several discrete angles. When the user is finished working on the computer, the user may close the lid. As the user closes the lid, the separated keyboard halves are automatically rejoined without any additional effort by the user. In the corners of the keyboard sections, opposite to the right and left of the corner in which the hinge portion is formed, are formed a plurality of lever grooves which allow the keyboard sections to be maintained in a spread-apart state. In the upper part of the base housing, levers are formed that catch the lever grooves. When the user has completed working on the computer, the lid is closed, causing the levers become removed from the grooves, releasing the keyboard sections from their spread-apart states, and allowing the keyboard sections to rotate back together to a closed position.

Gluskoter et al., U.S. Pat. No. 5,735,618 describes a computing system having a keyboard that is supported from a work surface by one or more support members. The positions of the support members relative to the keyboard are varied in accordance with a predetermined timed sequence, causing corresponding variances in the height of the housing portions corresponding to the support members. The intervals between height variances are such that the latter variances are not noticeable by the user of the system.

Selker, U.S. Pat. No. 6,076,784 describes an apparatus and method of adjusting the height and/or angle of a keyboard/wrist rest during use. A modified standard keyboard includes a processor, motors, motor controllers, and height adjusting legs to create a keyboard device, which changes angle over time. In an alternative embodiment, a retrofit solution for existing keyboards is disclosed. The keyboard may be adjusted incrementally, infinitely, by a pattern, or impulse over a period of time.

Nogueira, U.S. Pat. No. 6,454,224 describes an assembly for supporting a user's forearms and wrists while still allowing substantially full mobility of the user's arms and hands to enable him to comfortably and effectively operate a keyboard and mouse. The assembly includes left and right subassemblies, each including an armrest. Each subassembly is configured to enable the armrest to move laterally and longitudinally relative to a keyboard mounted on the surface of a support plate, swivel about multiple axes oriented substantially perpendicular to the surface, and tilt about an axis oriented substantially parallel to the surface.

Our prior art search with abstracts described above teaches a hand gliding support, an automatic keyboard moving apparatus, a portable computer having a separable keyboard which moves in response to movement of a display unit, a method and apparatus for adjusting the height of a keyboard, a continuous moving keyboard/wrist rest, and a forearm and wrist support assembly for a keyboard user, but does not teach a shiftable keyboard tray capable of positioning a selected portion of the keyboard under the hand of a user based upon relatively slight movement of the hand upon a palm rest. The present invention fulfills these needs and provides further related advantages as described in the following summary.

SUMMARY OF THE INVENTION

The present invention teaches certain benefits in construction and use which give rise to the objectives described below.

The shiftable keyboard tray of the present invention generally comprises a base, a carriage movable on the base and configured with an upper surface for support of the keyboard, and a palm rest movable on the base offset from the carriage and operably connected to the carriage through a coupler configured to enable movement of the carriage in a second direction when the palm rest is moved in an opposite first direction, whereby a user may place a hand on the palm rest and shift the palm rest in a selected direction so as to position a selected portion of the keyboard under the hand for ease of use. In a first exemplary embodiment, the coupler comprises a motor mounted in engaging relationship between the carriage and the base and at least one actuation switch coupled to the palm rest and operably connected to the motor such that the movement of the palm rest triggers the actuation switch and actuates the motor so as to shift the carriage. A positioning device is mounted in engaging relationship between the carriage and the base and operably connected to the motor so as to provide data to the motor regarding the position of the carriage. In a second exemplary embodiment, the positioning device itself serves as the coupler operably connecting the palm rest to the carriage.

In use of the shiftable keyboard tray, a keyboard is first placed on the carriage movable on the base. Then, the user places a hand on the palm rest movable on the base offset from the carriage and moves the palm rest in a first direction. The carriage is shifted in an opposite second direction as caused by the movement of the palm rest in the first direction, whereby a selected portion of the keyboard is positioned under the hand for ease of use. The process of moving the palm rest so as to cause the carriage, and thus the keyboard, to shift to a desired location, is then repeated as desired.

A primary objective of the present invention is to provide an apparatus and method of use of such apparatus that provides advantages not taught by the prior art.

Another objective is to provide such an invention capable of shifting a keyboard in a selected direction when a palm rest on which a user's hand is placed is shifted in an opposite direction.

A further objective is to provide such an invention capable of shifting the keyboard a relatively large distance when the palm rest is shifted a relatively small distance.

A still further objective is to provide such an invention capable of providing for convenient and efficient use of a keyboard by one hand.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 2 is a perspective view thereof;

FIG. 3 is a schematic view thereof;

DETAILED DESCRIPTION OF THE INVENTION

The above described drawing figures illustrate the invention in at least one of its preferred embodiments, which is further defined in detail in the following description.

Figure 1:
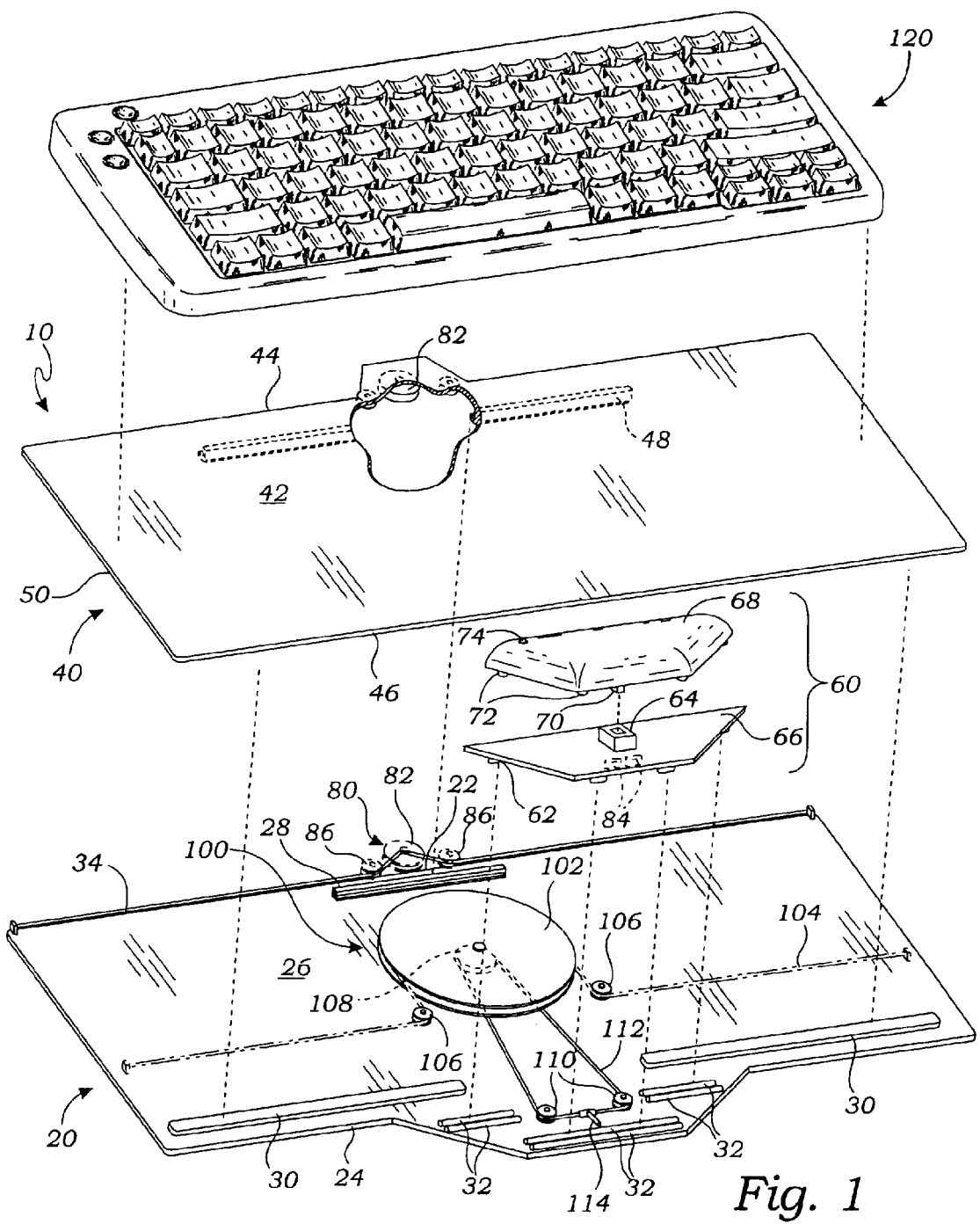
FIG. 1 is an exploded perspective view of the preferred embodiment of the invention.
Figure 4:
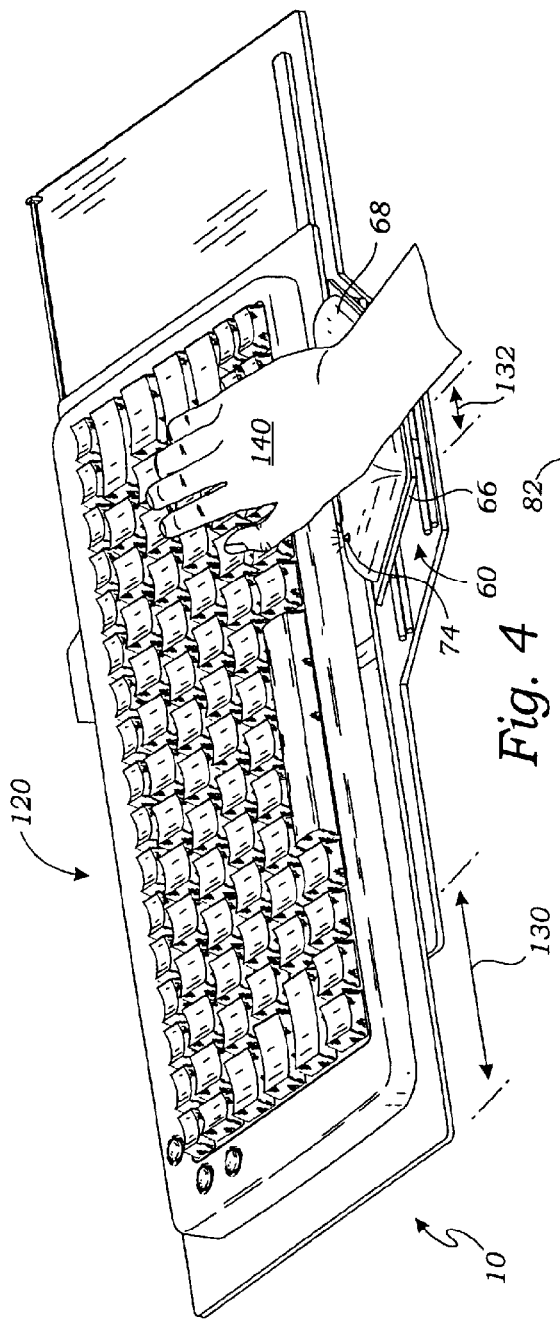
FIG. 4 is a perspective view thereof in a shifted position.
Figure 5:
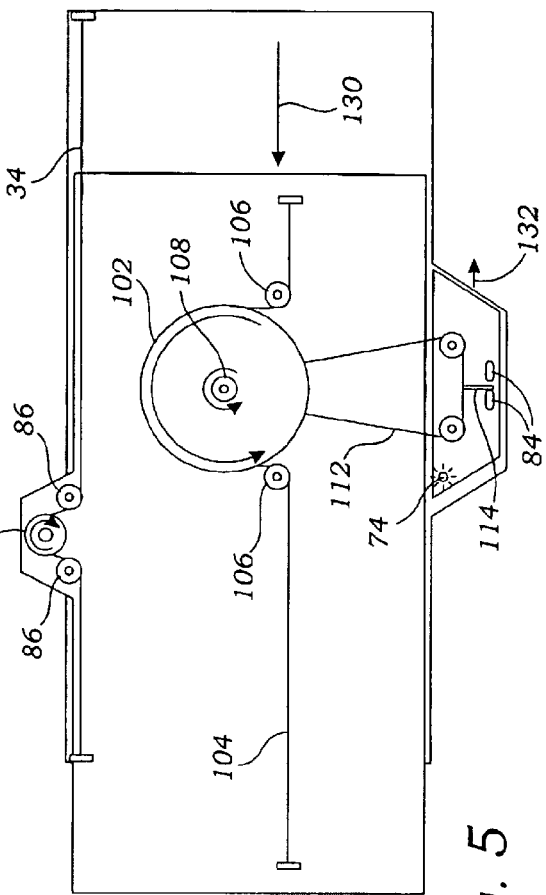
FIG. 5 is a schematic view thereof in a shifted position.

An exemplary embodiment of the shiftable keyboard tray 10 of the present invention generally includes a base 20, a carriage 40 movable on the base 20 and configured with an upper surface 42 for support of a keyboard 120, and a palm rest 60 movable on the base 20 offset from the carriage 40 and operably connected to the carriage 40 through a coupler 80 configured to enable movement of the carriage in a second direction 130 (FIGS. 4 and 5) when the palm rest is moved in an opposite first direction 132 (FIGS. 4 and 5), whereby a user may place a hand 140 (FIG. 4) on the palm rest 60 and shift the palm rest 60 in a selected direction so as to position a selected portion of the keyboard 120 under the hand 140 for ease of use, as explained in further detail below. In the exemplary embodiment, the base 20 is configured with a rectangular profile so as to have opposite long rear and front edges 22, 24 and is formed on its upwardly-facing surface 26 with an upwardly-projecting track guide 28 parallel with and offset from the rear edge 22. The carriage 40 is similarly configured with a rectangular profile having opposite long rear and front edges 44, 46 and is formed with a downwardly-projecting bracket 48 parallel to and offset from the rear edge 44 and configured to slidably engage the track guide 28. As such, the track guide 28 and the bracket 48 cooperate to allow the carriage 40 to slide laterally relative to the base 20. Skid plates 30 may be formed on the upwardly-facing surface 26 of the base 20 parallel to and offset from its front edge 24 so as to support the front edge 46 of the carriage 40 and position the carriage 40 substantially parallel to and spaced from the base 20. It will be appreciated by those skilled in the art that while a laterally sliding arrangement between a substantially parallel base 20 and carriage 40 is shown and described in the exemplary embodiment, numerous other engagement and movement relationships, including, but not limited to, a rolling arrangement, a kinematic arrangement, a pivoting arrangement, or various other sliding arrangements incorporating linear slides, tongue and groove arrangements, and the like, may be employed in movably installing the carrier 40 on the base 20 without departing from the spirit and scope of the invention. Similarly, in the exemplary embodiment, the palm rest 60 is shown and described as having downwardly-projecting tabs 62 that slidably engage pairs of contoured ribs 32 formed on the upwardly-facing surface 26 of the base 20, though it will be appreciated that the palm rest 60 may be movably mounted on the base 20 so as to be laterally shiftable, pivotable, rotatable, etc. through employing numerous other engagement and movement relationships now known or later developed. With continued reference to FIG. 1, the coupler 80 is shown in the exemplary embodiment as comprising a motor 82 mounted in engaging relationship between the carriage 40 and the base 20 and as further comprising at least one actuation switch 84 coupled to the palm rest 60 and operably connected to the motor such that the movement of the palm rest 60 triggers the actuation switch 84 and actuates the motor 82 so as to shift the carriage 40. In this embodiment of the coupler 80, it will thus be appreciated that the operable connection between the palm rest 60 and the carriage 40 comprises a motor 82, an actuation switch 84 and electrical circuitry (not shown). It will be further appreciated that in alternative embodiments the coupler 80 may comprise mechanical coupling members, such as the mechanical positioning device 100 described below, whereby the palm rest 60 is operably connected to the carriage 40 through mechanical rather than electrical means. In the exemplary embodiment of the present invention employing the motorized coupler 80, a cog belt 34 is installed on the upwardly-facing surface 26 of the base 20 substantially along the rear edge 22, and the motor 82 is mounted on the underside 50 of the carriage 40 so as to engage the cog belt 34 and pull the carriage 40 in either direction along the cog belt 34 when the motor 82 is selectively actuated by the actuation switch 84, as explained more fully below. The motor 82 may be a low voltage DC motor or other motor now known or later developed in the art. Additional idler pulleys 86 may be employed in routing the otherwise linear cog belt 34 through the. motor 82's drive and keeping the cog belt 34 in tension. While the motor 82 is shown and described as being mounted on the carriage 40 so as to engage a cog belt 34 mounted on the base 20, it will be appreciated by those skilled in the art that the motor 82 may just as easily be mounted on the base 20 and the cog belt 34 on the carriage 40. Furthermore, numerous other motor 82 and drive arrangements such as involving gears, screws or the like, may also be employed in the present invention to facilitate movement between the carriage 40 and base 20. The positioning device 100 is mounted in engaging relationship between the carriage 40 and the base 20 and is operably connected to the motor 82 so as to provide position feedback data to the motor 82 regarding the position of the carriage 40. Specifically, in the exemplary embodiment wherein the positioning device 100 cooperates with the coupler 80 to selectively position the carriage 40 relative to the base 20, a positioning pulley 102 is rotatably mounted on the upwardly-facing surface 26 of the base 20 and a carriage belt 104 is mounted on the underside 50 of the carriage 40 so as to frictionally engage the positioning pulley 102. Tensioning pulleys 106 are rotatably mounted on the base 20 substantially offset from the positioning pulley 102 and are configured to frictionally engage the carriage belt 104 so as to keep the carriage belt 104 taught against the positioning pulley 102. The positioning pulley 102 may then provide position data to the motor 82 in the form of electrical signals so as to cooperate with the signals coming from the actuation switch 84, as in a control circuit, to control the operation of the motor 82. For example, it will be appreciated by those skilled in the art that such control of the motor 82 by the cooperation of the positioning pulley 102 feedback signals and the signals generated by the actuation switch 84 upon movement of the palm rest 60 by a user effectively allows for position stops, or limit switches, on the lateral movement of the carriage 40 relative to the base 20, thereby ensuring safe and effective operation of the keyboard tray 10. Moreover, the control of the motor 82 in cooperation with the positioning device 100 allows for motor speed control such that the speed and movement of the carriage may be rapid or slow as dictated by the nature of the movement of the palm rest, providing for further convenience and ease of use. It will be appreciated by those skilled in the art that numerous other position feedback devices and systems now known and later developed may be employed in communicating position data to the coupler 80 so as to control the position of the carriage 40 relative to the base 20 without departing from the spirit and scope of the present invention. In order to further link the position of the carriage 40 and the movement of the palm rest 60, in the exemplary embodiment, a reduction pulley 108 is coaxially mounted on the positioning pulley 102, a pair of offset idler pulleys 110 are mounted on the upwardly-facing surface 26 of the base 20 substantially beneath the palm rest 60, and a palm rest belt 112 is frictionally mounted between the reduction pulley 108 and the idler pulleys 110. While the exemplary positioning device 100 is shown and described as having pulleys 102, 108 rotatably mounted on the base 20, it will be appreciated that the positioning device 100 may just as easily be mounted in other locations and may involve gears, screws, or other devices rather than pulleys 102, 108 and belts 104, 112. The palm rest belt 112 is configured with a positioning tab 114 located between the idler pulleys 110 so as to selectively engage the actuation switch 84 mounted on the underside of the palm rest 60 when the palm rest 60 is moved in either direction, whereby the movement of the palm rest 60 both triggers the actuation switch 84 and rotates the positioning pulley 102, as explained in more detail below. In this embodiment wherein the positioning tab 114 selectively engages the actuation switch 84 when palm rest 60 is moved in either direction, the at least one actuation switch 84 is configured as a pair of offset actuation switches 84 between which the positioning tab 114 extends and alternately actuates one actuation switch 84 or the other. As such, it will be appreciated that the actuation switches 84 may be configured as left and right variable resistor switches so as to control the direction and speed of the motor 82. It will be further appreciated that numerous other switches now known and later developed may be employed in the present invention without departing from its spirit and scope. In an exemplary embodiment, the diameter of the reduction pulley 108 is approximately one-sixth of the diameter of the positioning pulley 102, thereby creating an approximately six-to-one reduction and providing approximately six inches of travel of the carriage 40 for every one inch of travel of the palm rest 60, which has tremendous advantages in use as explained below. It will be appreciated that while the exemplary reduction ratio is effectively 6:1, numerous other pulley reduction ratios may be employed in the keyboard tray 10 of the present invention depending on the relative sizes of the carriage 40, base 20 and palm rest 60, as dictated by the size of the keyboard 120 or other such device being used with the tray 10, but preferably ranging from 4:1 to 12:1. It will be further appreciated that such mechanical coupling and use of reduction pulleys or other such mechanical means to essentially multiply the movement of one component relative to the movement of another effectively provides an alternative embodiment of the present invention wherein the carriage 40 may be shifted in the opposite direction of, and over a relatively larger distance than, the palm rest 60 without the use of a motor 82 or the like. Specifically, in the alternative embodiment, the movement of the palm rest 60 shifts the positioning tab 114, whether through an actuation switch 84 or any other engagement means, in turn shifting the palm rest belt 112 and rotating the reduction pulley 108, in turn rotating the positioning pulley 102 and shifting the carriage 40 through the carriage belt 104. It follows that in this alternative embodiment, the positioning device 100, rather than the motor 82 and the actuation switch 84, comprises the coupler 80 configured to enable movement of the carriage 40 in a second direction 130 (FIGS. 4 and 5) when the palm rest 60 is moved in an opposite first direction 132 (FIGS. 4 and 5). It is to be understood, then, that, in addition to these two exemplary embodiments, numerous other configurations for mechanically, electrically or otherwise coupling the palm rest 60 to the carriage 40, alone or in combination, may be employed without departing from the spirit and scope of the present invention. Referring still to FIG. 1, in the exemplary embodiment, a power switch 64 is installed on the palm rest 60 and operably connected to the coupler 80 through an electrical circuit or wiring (not shown), the power switch 64 being configured to allow movement of the carriage 40 when the power switch 64 is selectively triggered. In the exemplary embodiment wherein the coupler 80 comprises a motor 82 mounted in engaging relationship between the carriage 40 and the base 20 and at least one actuation switch 84 coupled to the palm rest 60, the power switch 64 provides power to the motor 82 when selectively triggered so as to allow the motor 82 to shift the carriage 40 as directed by the actuation of the actuation switch 84 resulting from the movement of the palm rest 60. The power switch 64 is mounted on the palm rest 60 so as to face upwardly from a palm rest frame 66. A palm rest cap 68 is shiftably mounted on the palm rest 60 over the palm rest frame 66 so as to selectively shift downwardly when the hand 140 (FIG. 4) is placed on the palm rest 60. The palm rest cap 68 is formed with a downwardly-projecting palm rest tab 70 configured to trigger the power switch 64 installed on the palm rest frame 66 when the palm rest cap 68 is shifted downwardly. Spring-biased posts 72 are provided about the perimeter of the palm rest cap 68 so as to mount the palm rest cap 68 on the palm rest frame 66 and allow the palm rest cap 68 to shift downwardly toward the palm rest frame 66 as when the palm rest is in use and to cause the palm rest cap 68 to shift upwardly when not in use. Thus, as explained further below, it will be appreciated that the palm rest 60 conveniently allows power to the motor 82 through the actuation of the power switch 64 when the palm rest cap 68 is shifted downwardly toward the palm rest frame 66, as when a hand 140 (FIG. 4) is placed on the palm rest 60 during use, while cutting off power to the motor, and thereby preventing inadvertent or unwanted movement of the carriage 40 and waste of electricity, when the palm rest 60 is not in use and the palm rest cap 68 is in its at-rest, upwardly-biased position. In order to provide feedback to the user regarding whether the power switch 64 has been triggered and the motor 82 is actually with power and ready to operate in selectively shifting the carriage 40, an LED 74 or other indicator is provided on the palm rest cap 68 that is only illuminated when the power switch 64 has, in fact, been triggered and the motor 82 has power. It will be appreciated by those skilled in the art that the power switch 64 and its installation between the palm rest frame 66 and palm rest cap 68 is merely illustrative and that numerous pressure, toggle or other switches and numerous other indicators, and corresponding configurations of the palm rest 60, may be employed in the keyboard tray 10 without departing from the spirit and scope of the invention.

In use, referring now to FIGS. 2–5, a user first takes the keyboard tray 10 of the present invention and places a keyboard 120 or other such device on the upwardly-facing surface 42 of the carriage 40 movably installed on the base 20. The keyboard 120 is shown and described as freely resting on the carriage, but it will be appreciated by those skilled in the art that the keyboard 120 may be supported by and secured to the carriage in numerous other ways now known or later developed, such as through a strap, a clamp, an adhesive, a bolt or screw, a Velcro attachment, etc., without departing from the spirit and scope of the invention. The carriage 40 is shown in an at-rest position substantially centered over the base 20, though it will be appreciated, as explained further below, that the carriage 40 may be shifted and remain at rest in a variety of positions relative to the base 20, depending on its use. With the keyboard 120 so positioned and the carriage 40 at any location along the base 20, use of the keyboard tray 10 in enabling comfortable and convenient one-hand use of the keyboard 120 is generally accomplished by placing a hand 140 on the palm rest 60 and moving the palm rest 60 in a first direction 132, causing the carriage 40 to shift in an opposite second direction 130 so as to position a selected portion of the keyboard 120 under the hand 140 for ease of use. Specifically, with regard to the exemplary embodiment of the keyboard tray 10, when the tray 10 is not in use, the carriage 40 and base 20 are at rest and the coupler 80, comprising a motor 82 and at least one actuation switch 84 and through which the carriage 40 and base 20 are operably connected, is idle. As best shown in FIG. 3, when in a non-use, at-rest position, the motor 82 is not powered and not rotating and is at a stopped position along the cog belt 34. Similarly, the positioning device 100 mounted in engaging relationship between the carriage 40 and both the base 20 and the palm rest 60 is also idle, such that the positioning pulley 102 is not rotating and the carriage belt 104 and carriage 40 are at a stopped position. The palm rest 60 is also idle, such that the palm rest belt 112 is in a stopped position, due to both the non-movement of the carriage 40, and, in turn, the positioning pulley 102, and the non-movement of the palm rest 60 itself In this at-rest configuration, then, the positioning tab 114 located on the palm rest belt 112 between the two idler pulleys 110 is substantially centered between the actuation switches 84 and is in position to trigger either switch upon movement of the palm rest 60. Turning to FIGS. 4 and 5, when the keyboard tray 10 is in use, a user places her hand 140 on the palm rest 60 so as to shift the palm rest cap 68 downwardly relative to the palm rest frame 66, thereby depressing the power switch 64 (FIG. 1) within the palm rest 60 and powering up the motor 82 so as to render the coupler 80 between the carriage 40 and the base 20 operational. The LED 74 is then illuminated on the palm rest 60 to indicate that the system is powered up and ready for use. With the hand 140 still on the palm rest 60, the user shifts the palm rest 60 in a first direction 132. As best shown in FIG. 5, this movement of the palm rest 60 causes the positioning tab 114 to contact an actuation switch 84, which sends the appropriate signal to the motor 82 to cause the motor 82 to rotate and pull the carriage 40 along the cog belt 34. In the exemplary use shown, the first direction 132 in which the palm rest is shifted is to the right, causing the positioning tab 114 to contact the left actuation switch 84, which in turn sends a signal to the motor 82 to rotate clockwise and be pulled along the cog belt 34 from right to left, thereby shifting the carriage to the left and making the movement of the carriage 40 in the second direction 130 opposite the movement of the palm rest 60 in the first direction 132. Furthermore, when the carriage 40 is shifted to the left, it will be appreciated that the carriage belt 104 attached at opposite ends to the underside 50 (FIG. 1) of the carriage 40 also shifts to the left, rotating the positioning pulley 102 counterclockwise. It is this rotation of the positioning pulley 102 that provides position feedback date to the motor 82 and thus cooperates with the actuation switches 84 to control the motor 82's direction and speed. In turn, the reduction pulley 108 rotates counterclockwise, turning the palm rest belt 112 counterclockwise and effectively shifting the positioning tab 114 from left to right, thereby tending to reposition the positioning tab 114 centered between the actuation switches 84, which, along with the palm rest 60 itself, have also shifted from left to right in the first direction 132. Therefore, it will be appreciated by those skilled in the art that the movement of the palm rest 60 in either direction initiates, through contact between the positioning tab 114 and the respective actuation switch 84, movement of the carriage 40 through the motor 82 in an opposite direction, which, in turn, through the positioning pulley 102, reduction pulley 108 and palm rest belt 112, serves to shift the positioning tab 114 in the same direction as the palm rest 60 so as to realign the positioning tab 114 with the space between the actuation switches 84 and configure. the tray 10 for further position input from the user through the palm rest 60. As mentioned above, it will be further appreciated that even without the motor 82 and actuation switches 84, wherein the positioning device 100 serves as the coupler 80 between the carriage 40 and the base 20, the movement of the palm rest 60 in a first direction 132 causes the positioning tab 84 to move in the same direction through simple mechanical contact. In the example in which the first direction 132 is to the right, it follows that the positioning tab 114 is also shifted to the right, turning the palm rest belt 112 counterclockwise, which in turn rotates the reduction pulley 108 and the positioning pulley. 102 counterclockwise, thereby pulling the carriage belt 104 and the carriage 40 itself from right to left, or in the opposite second direction 130. Thus, even without the motor 82, it is possible to shift the palm rest 60 in a selected direction and have the carriage 40 shift in an opposite direction, thereby conveniently bringing a selected portion of the keyboard 120 placed on the carriage 40 under the hand 140 of the user. The travel of the carriage 40 relative to the palm rest 60 is dictated by the reduction ratio between the positioning pulley 102 and the reduction pulley 108, which is 6:1 in the exemplary embodiment. As such, it will be appreciated that for every one inch of movement of the palm rest 60 in either direction, the carriage 40 moves six inches in the opposite direction. In this way, only slight movement of the user's hand 140 upon the palm rest 60 provides multiplied movement of the carriage 40, and, thus, the keyboard 120 under the user's hand 140. As such, the keyboard tray 10 of the present invention, provides for comfortable, convenient and effective one-hand operation of a computer keyboard and the like. It will be appreciated by those skilled in the art that while the method of using the keyboard tray 10 has been described and shown in connection with the exemplary embodiments of the invention, numerous other embodiments of the invention may be employed in its use without departing from the spirit and scope of the invention.

While the invention has been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus for shifting a keyboard comprising:
   a base;
   a carriage movable on the base and configured with an upper surface for support of the keyboard; and
   a palm rest movable on the base offset from the carriage and operably connected to the carriage through a coupler configured to enable movement of the carriage in a second direction when the palm rest is moved in an opposite first direction, whereby a user may place a hand on the palm rest and shift the palm rest in a selected direction so as to position a selected portion of the keyboard under the hand for ease of use.

2. The apparatus of claim 1 wherein the coupler comprises:
   a motor mounted in engaging relationship between the carriage and the base; and
   at least one actuation switch coupled to the palm rest and operably connected to the motor such that the movement of the palm rest triggers the actuation switch and actuates the motor so as to shift the carriage.

3. The apparatus of claim 2 wherein:
   a cog belt is installed on the base; and
   the motor is installed on the carriage so as to engage the cog belt.

4. The apparatus of claim 2 further comprising a positioning device mounted in engaging relationship between the carriage and the base and operably connected to the motor so as to provide data to the motor regarding the position of the carriage.

5. The apparatus of claim 4 wherein the positioning device is further mounted in engaging relationship with the palm rest.

6. The apparatus of claim 4 wherein the positioning device comprises:
   a positioning pulley rotatably mounted on the base; and
   a carriage belt mounted on the carriage so as to frictionally engage the positioning pulley.

7. The apparatus of claim 6 wherein a pair of tensioning pulleys is rotatably mounted on the base substantially offset from the positioning pulley, the tensioning pulleys being configured to frictionally engage the carriage belt so as to keep the carriage belt taught against the positioning pulley.

8. The apparatus of claim 6 wherein:
   a reduction pulley mounted on the positioning pulley;
   a pair of offset idler pulleys are mounted on the base; and
   a palm rest belt is frictionally mounted between the reduction pulley and the idler pulleys and is configured with a positioning tab located between the idler pulleys so as to selectively engage the actuation switch when the palm rest is moved, whereby the movement of the palm rest both triggers the actuation switch and rotates the positioning pulley.

9. The apparatus of claim 8 wherein the diameter of the reduction pulley is approximately one-sixth of the diameter of the positioning pulley, thereby creating an approximately six-to-one reduction and providing approximately six inches of travel of the carriage for every one inch of travel of the palm rest.

10. The apparatus of claim 1 wherein the coupler comprises:
    a positioning pulley rotatably mounted on the base;
    a reduction pulley mounted on the positioning pulley;
    a carriage belt mounted on the carriage so as to frictionally engage the positioning pulley;
    a pair of offset idler pulleys mounted on the base; and
    a palm rest belt frictionally mounted between the reduction pulley and the idler pulleys and configured with a positioning tab located between the idler pulleys so as to selectively engage the palm rest, whereby the movement of the palm rest shifts the positioning tab, in turn shifting the palm rest belt and rotating the reduction pulley, in turn rotating the positioning pulley and shifting the carriage through the carriage belt.

11. The apparatus of claim 10 wherein the diameter of the reduction pulley is approximately one-sixth of the diameter of the positioning pulley, thereby creating an approximately six-to-one reduction and providing approximately six inches of travel of the carriage for every one inch of travel of the palm rest.

12. The apparatus of claim 1 wherein a power switch is installed on the palm rest and operably connected to the coupler, the power switch being configured to allow movement of the carriage when the power switch is selectively triggered.

13. The apparatus of claim 12 wherein:
    a motor is mounted in engaging relationship between the carriage and the base;
    the power switch provides power to the motor when selectively triggered; and
    at least one actuation switch is coupled to the palm rest such that the movement of the palm rest triggers the actuation switch and actuates the motor so as to shift the carriage relative to the base.

14. An apparatus for shifting a keyboard comprising:
    a base;
    a means for supporting the keyboard movable on the base;
    a means for supporting a palm of a user, the palm supporting means movable on the base and offset from the keyboard supporting means; and
    a means for shifting the keyboard supporting means in a second direction when the palm supporting means is shifted in an opposite first direction, wherein the user may place the palm on the palm supporting means and shift the palm supporting means in a selected direction so as to position a selected portion of the keyboard for ease of use.

15. An apparatus for shifting a keyboard comprising:

a base;

a carriage slidably mounted on the base and configured with an upper surface for support of the keyboard;

a motor mounted in engaging relationship between the carriage and the base;

a palm rest slidably mounted on the base offset from the carriage; and at least one actuation switch mounted on the palm rest and operably connected to the motor, the actuation switch being configured to actuate the motor so as to shift the carriage in a second direction when the actuation switch is triggered by movement of the palm rest in an opposite first direction, whereby a user may place a hand on the palm rest and shift the palm rest in a selected direction so as to position a selected portion of the keyboard under the hand for ease of use.

16. The apparatus of claim 15 further comprising:

a positioning pulley rotatably mounted on the base and operably connected to the motor;

a reduction pulley coaxially mounted on the positioning pulley;

a carriage belt mounted on the carriage so as to frictionally engage the positioning pulley;

a pair of offset idler pulleys mounted on the base underneath the palm rest; and a palm rest belt frictionally mounted between the reduction pulley and the idler pulleys and configured with a positioning tab located between the idler pulleys so as to selectively engage the palm rest, whereby the movement of the palm rest shifts the positioning tab, in turn shifting the palm rest belt and rotating the reduction pulley, in turn rotating the positioning pulley and providing carriage position feedback to the motor.

17. A method of one-hand operation of a keyboard comprising the steps of:

positioning the keyboard on a carriage movable on a base;

placing a hand on a palm rest movable on the base offset from the carriage;

moving the palm rest in a first direction; and shifting the carriage in an opposite second direction as caused by the movement of the palm rest in the first direction, whereby a selected portion of the keyboard is positioned under the hand for ease of use.

18. The method of claim 17 comprising the further steps of:

engaging the base with a motor mounted on the carriage;

triggering at least one actuation switch coupled to the palm rest when the palm rest is moved in the first direction; and actuating the motor upon triggering the actuation switch so as to shift the carriage in the second direction.

19. The method of claim 18 comprising the further step of providing feedback to the motor of the position of the carriage relative to the base through a positioning device mounted in engaging relationship between the carriage and the base.

20. The method of claim 18 comprising the further steps of:

shifting a palm rest cap mounted on the palm rest downwardly when the hand is placed on the palm rest;

triggering a power switch installed beneath the palm rest cap when the palm rest cap is shifted downwardly; and providing power to the motor when the power switch is depressed, whereby the motor is then enabled for actuation upon movement of the palm rest in the first direction.

* * * * *